United States Patent [19]
Ishii et al.

[11] Patent Number: 6,021,365
[45] Date of Patent: Feb. 1, 2000

[54] METHOD OF TESTING REGENERATIVE BRAKING FORCE IN ELECTRIC VEHICLE

[75] Inventors: Yukihisa Ishii; Hiroyuki Matsuo; Yasushi Aoki, all of Wako, Japan

[73] Assignee: Honda Giken Kogyo Kabushiki Kaisha, Tokyo, Japan

[21] Appl. No.: 09/012,192

[22] Filed: Jan. 23, 1998

[30] Foreign Application Priority Data

Feb. 4, 1997 [JP] Japan .................................. 9-021312

[51] Int. Cl.$^7$ ...................................................... A61F 2/33
[52] U.S. Cl. ................................ 701/22; 303/3; 303/152; 477/188; 180/65.1
[58] Field of Search ................................ 701/22, 69, 81; 303/3, 152, 155, 190; 188/156, 158; 477/182, 188; 180/65.1, 197

[56] References Cited

U.S. PATENT DOCUMENTS

| | | | |
|---|---|---|---|
| 4,270,806 | 6/1981 | Venkataperumal et al. | 303/3 |
| 5,318,355 | 6/1994 | Asanuma et al. | 303/3 |
| 5,322,352 | 6/1994 | Ohno et al. | 303/3 |
| 5,399,000 | 3/1995 | Aoki et al. | 303/3 |
| 5,433,512 | 7/1995 | Aoki et al. | 303/3 |

*Primary Examiner*—William A. Cuchlinski, Jr.
*Assistant Examiner*—Gertrude Arthur
*Attorney, Agent, or Firm*—Nikaido, Marmelstein, Murray & Oram LLP

[57] ABSTRACT

In an electric vehicle having front wheels braked by regenerative braking and hydraulic braking and rear wheels hydraulically braked, it is possible to check the magnitude of the regenerative braking force easily and accurately, by using a two-axle chassis dynamometer. Assuming that the front wheel braking force $F_2'$ detected by the chassis dynamometer is the total braking force $C_2'$ of the front and rear wheels, the total braking force $C2'$ is broken down into component forces according to braking force distribution ratio data previously stored in a memory, to calculate a reference regenerative braking force $A_2'D_2'$. Based on the actually detected pedal depressing force $A_2$ and the distribution ratio data, an imaginary pedal depressing force $A_2'$ is calculated that is required to produce a total braking force of the driven wheels and follower wheels equal to the braking force $F_2'$, generated by the driven wheels in the actual pedal depressing force $A_2$. Based on the imaginary pedal depressing force $A_2'$ and the distribution ratio data, the imaginary regenerative braking force $A_2'D_2'$ that is produced by the driven wheels in the imaginary pedal depressing force $A_2'$, is calculated and then compared with the reference regenerative braking force $A_2'D_2'$.

2 Claims, 8 Drawing Sheets

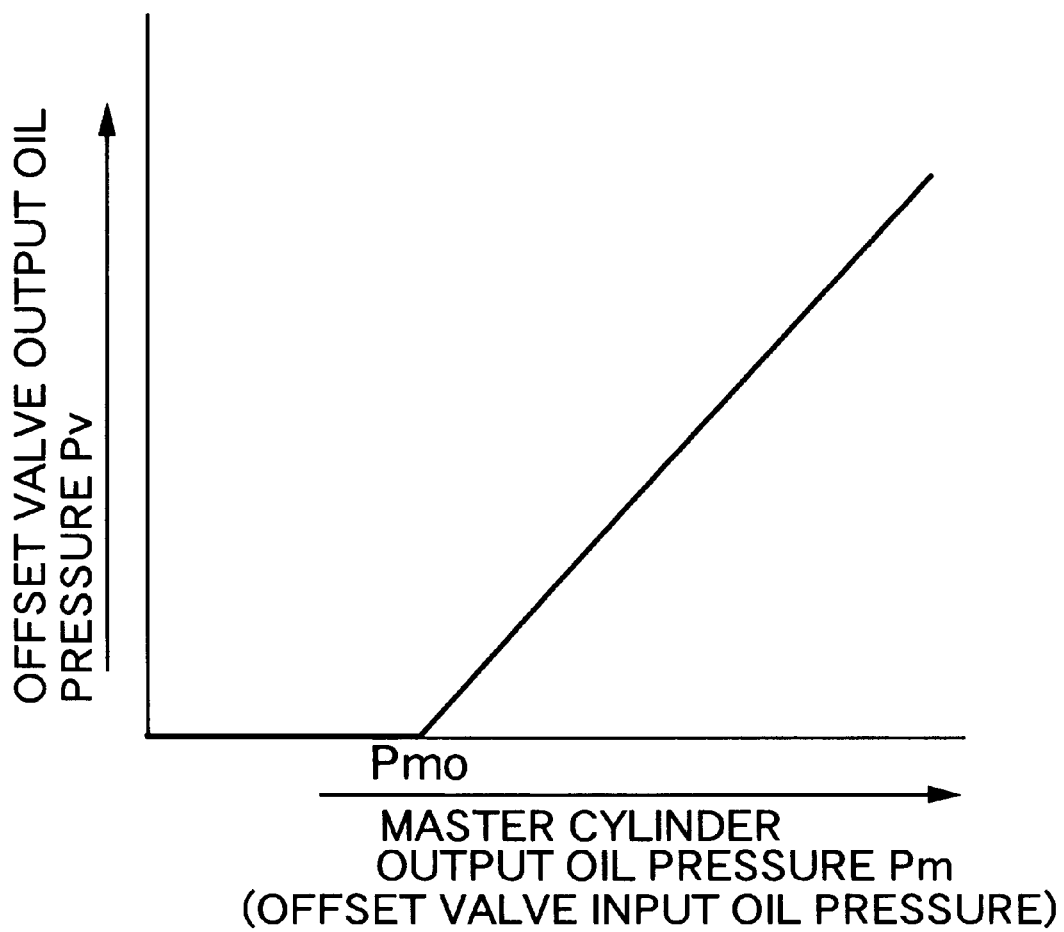

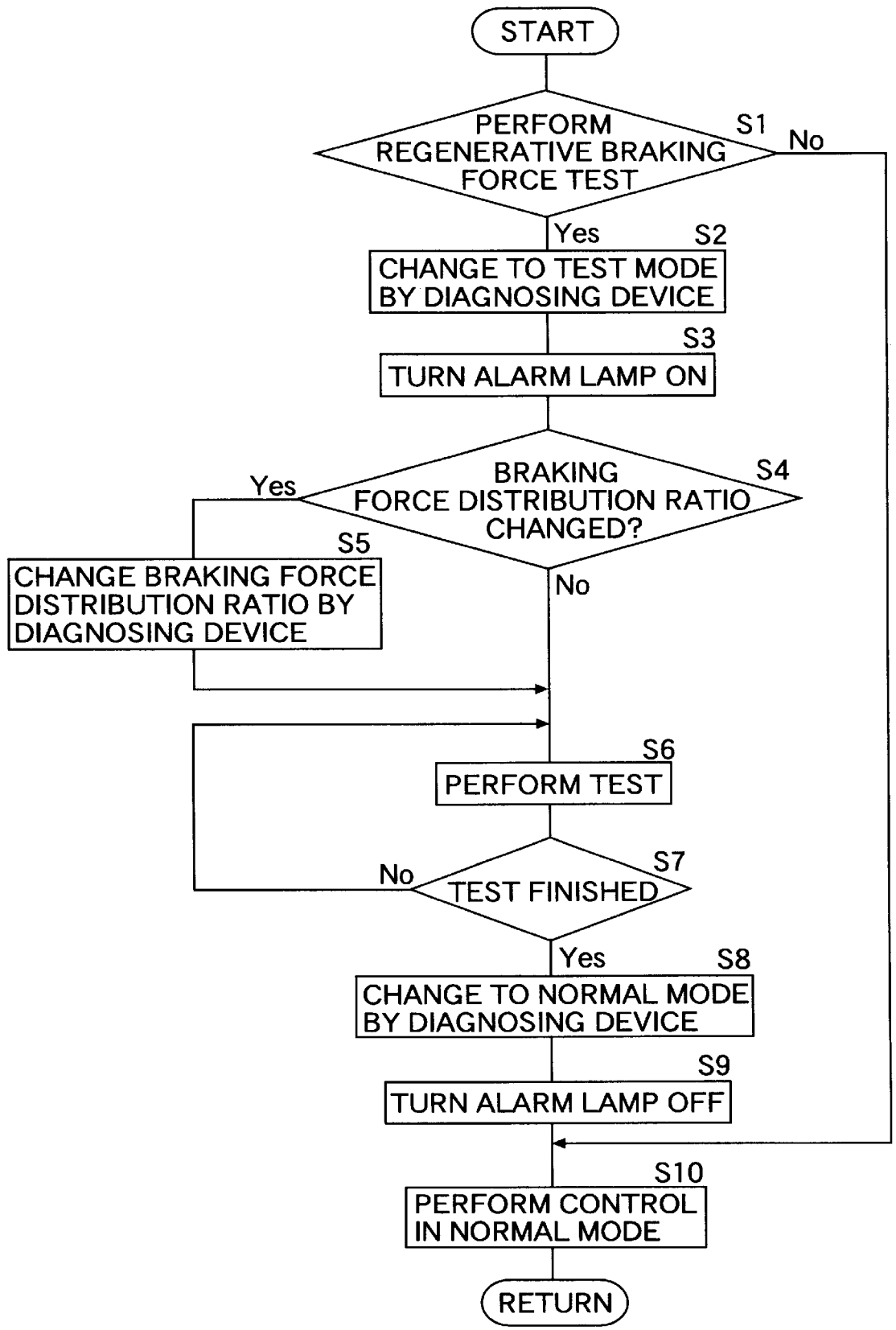

METHOD OF TESTING REGENERATIVE BRAKING FORCE IN ELECTRIC VEHICLE

BACKGROUND OF THE INVENTION

1. Field of the Invention

The present invention relates to a method of testing the regenerative braking force of the driven wheels of an electric vehicle by using a two-axle chassis dynamometer in the vehicle in which the driven wheels can be hydraulically braked and regeneratively braked.

2. Description of the Prior Art

In an electric vehicle which travels by driving the driven wheels with an electric motor, a priority is given to regenerative braking to brake the driven wheels and thereby to effectively recover energy. When a sufficient braking force is not obtained with the regenerative braking alone, the hydraulic braking is also actuated to secure a sufficient total braking force.

The braking force of an electric vehicle produced in a factory is tested using a chassis dynamometer to judge whether the regenerative braking force is produced normally or not. Since the distribution characteristic of the regenerative and hydraulic braking forces with respect to the brake pedal depressing force is stored in advance, the determination of whether the regenerative braking force is produced normally is made by calculating the regenerative braking force based on the brake pedal depressing force and the braking force distribution characteristic, calculating the value of the regenerative braking force based on the braking force detected by the chassis dynamometer and the braking force distribution characteristic, and comparing the two values.

There may be a situation where a four-axle chassis dynamometer that can measure the braking force of the driven wheels and the braking force of the follower wheels at the same time is not available for the test on the braking force of an electric vehicle, and therefore a two-axle chassis dynamometer must be used. In such a case, if the braking force measured by the two-axle chassis dynamometer, is used as is, an error may be included in the results of test because the braking force measured by the two-axle chassis dynamometer includes only the braking force of the driven wheels and does not include the braking force of the follower wheels. Hence, the use of the two-axle chassis dynamometer requires a troublesome correction processing.

SUMMARY OF THE INVENTION

The present invention has been made in consideration of the circumstances described above and has an object to enable easy and accurate test on the regenerative braking force of an electric vehicle by using a two-axle chassis dynamometer.

According to the present invention, the braking force of the driven wheels is detected by the two-axle chassis dynamometer; and assuming that the detected braking force is a total braking force of the driven wheels and follower wheels, the reference regenerative braking force produced by the driven wheels is calculated on the basis of the data obtained by determining the braking force distribution to the driving and follower wheels in advance, as a function of force applied to the brake pedal. Based on the actual pedal depressing force and the data, an imaginary pedal depressing force is calculated that is required to produce a total braking force of the driven wheels and follower wheels equal to the braking force generated by the driven wheels in the actual pedal depressing force. Based on the imaginary pedal depressing force and the data, an imaginary regenerative braking force that is produced by the driven wheels in the imaginary pedal depressing force is calculated and then compared with the reference regenerative braking force. In this way the regenerative braking force test is conducted.

When an electric vehicle with an ABS device is mounted on the two-axle chassis dynamometer, the ABS device is activated because the follower wheels do not rotate and are locked, limiting the regenerative braking of the driven wheels and rendering the regenerative braking force test impossible. During the test using the two-axle chassis dynamometer, however, the regenerative braking of the driven wheels can be performed even when the ABS device is actuated, thus allowing the regenerative braking force test to be conducted without trouble.

BRIEF DESCRIPTION OF THE DRAWINGS

FIG. 3 is a graph showing the input/output characteristic of the offset valve.

FIG. 5 is a flow chart showing the procedure of the regenerative braking force test.

DETAILED DESCRIPTION OF THE PREFERRED EMBODIMENT

The mode for carrying out the present invention will be described in conjunction with an embodiment shown in the accompanying drawings.

Figure 1:
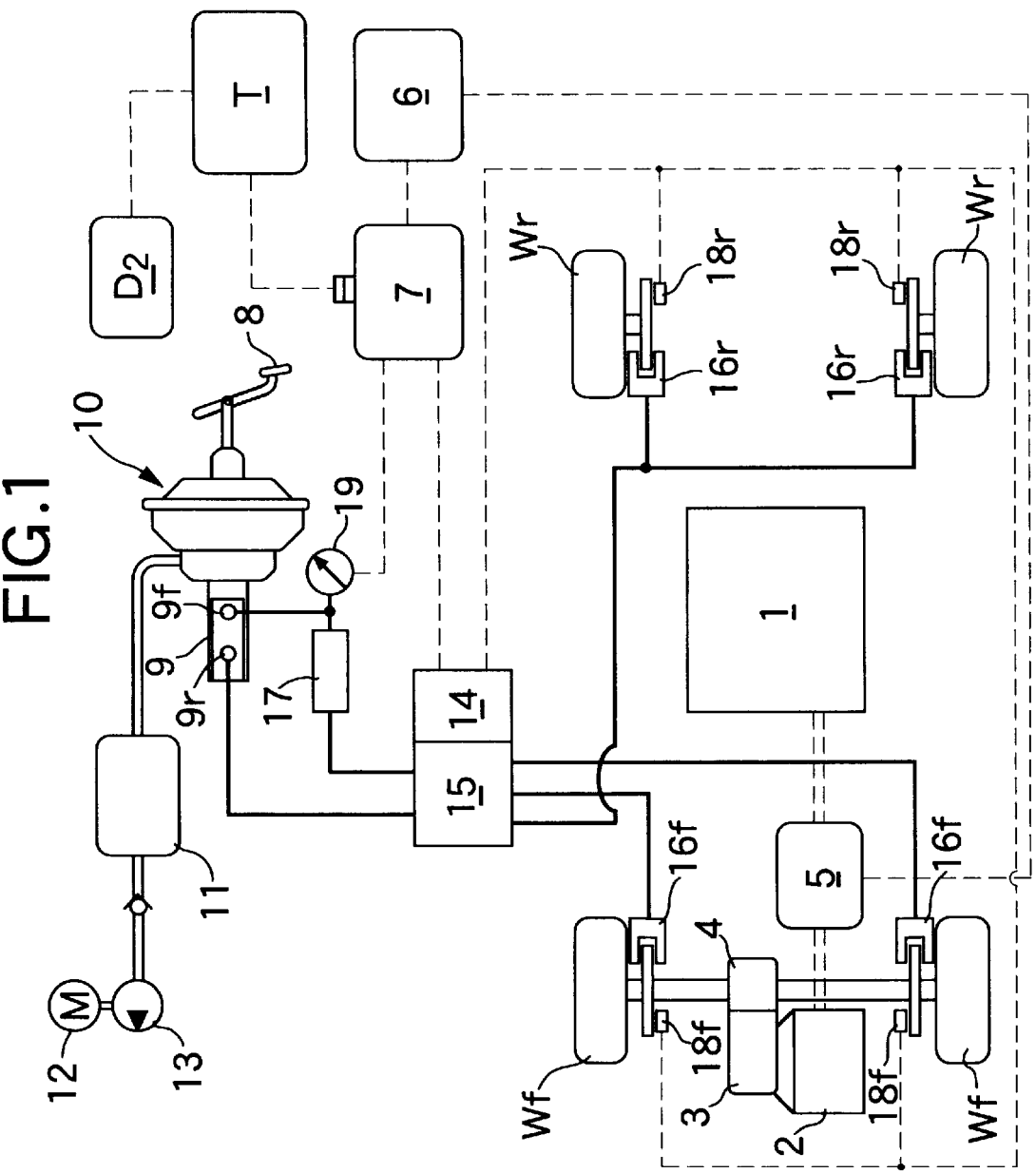
FIG. 1 is an overall configuration of an electric vehicle having a braking system in an embodiment of the present invention.

First, the overall configuration of the braking system of an electric vehicle will be described referring to FIG. 1. The electric vehicle is a four-wheel motor vehicle having a pair of front wheels Wf, Wf as driven wheels and a pair of rear wheels Wr, Wr as follower wheels, with the front wheels Wf, Wf connected through a transmission 3 and a differential gear 4 to an electric motor 2, which has a battery 1 as an energy source. Installed between the battery 1 and the electric motor 2 is a PDU (power drive unit) 5 which controls the driving of the electric motor 2 by the battery 1 and also controls the charging of the battery 1 with the electricity generated by the electric motor 2 during the regenerative braking. The power drive unit 5 is connected to the motor's electronic control unit (motor ECU) 6, which in turn is connected to a brake ECU 7.

A negative pressure booster 10, which amplifies the force applied to a brake pedal 8 and transmits the amplified force to a master cylinder 9, is connected to a negative pressure tank 11, whose pressure is reduced by a negative pressure pump 13 driven by a negative pressure pump drive motor 12. A rear output port 9r of the master cylinder 9 is connected to brake cylinders 16r, 16r of the left and right rear wheels Wr, Wr through a modulator 15 controlled by an ABS (antilock braking system) ECU 14. A front output port 9f of the master cylinder 9 is connected to brake cylinders 16f, 16f of the left and right front wheels Wf, Wf through an offset valve 17 comprising a solenoid valve and the modulator 15.

Wheel-speed sensors 18f, 18f; 18r, 18r provided to the front wheels Wf, Wf and the rear wheels Wr, Wr are connected to the ABS ECU 14. The ABS ECU 14 actuates the modulator 15 to reduce the brake pressure transmitted to the brake cylinders 16f, 16f; 16r, 16r when the front wheels Wf, Wf and/or rear wheels Wr, Wr tend to be locked. The brake ECU 7 connected to a hydraulic pressure sensor 19, which detects the output oil pressure Pm of the front output port 9f of the master cylinder 9 (i.e., the depressing force applied to the brake pedal 8), controls the regenerative braking force of the electric motor 2 through the motor ECU 6 and the PDU 5.

Figure 2:
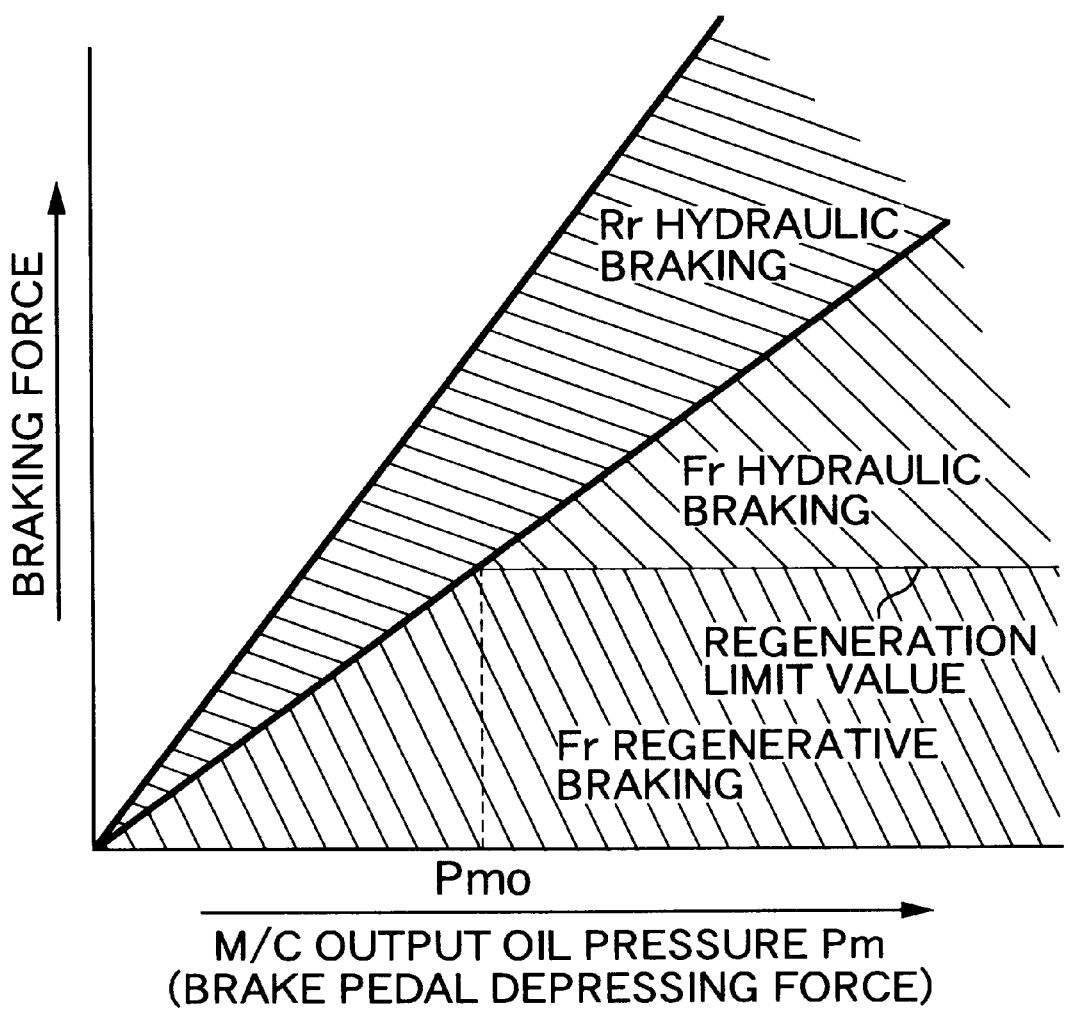
FIG. 2 is a graph showing a distribution ratio between the hydraulic braking force and the regenerative braking force of the front and rear wheels.

FIG. 2 shows a braking force distribution characteristic of the front wheels Wf, Wf and the rear wheels Wr, Wr with respect to the depressing force applied to the brake pedal 8. This data is stored previously in the brake ECU 7. The front wheels Wf, Wf as the driven wheels, are braked by both the hydraulic and regenerative brakings. The regenerative braking is executed first until the output oil pressure Pm of the master cylinder 9 reaches the offset oil pressure Pmo. When the regenerative braking force reaches the regeneration limit value $R_0$, the hydraulic braking is then initiated while maintaining the regeneration limit value $R_0$. As a result, the braking force of the front wheels Wf, Wf increases linearly with the output oil pressure Pm. On the other hand, the rear wheels Wr, Wr as the follower wheels, are braked only by hydraulic pressure and the braking force of the rear wheels Wr, Wr increases linearly with increase in the output oil pressure Pm. By performing the regenerative braking in preference to the hydraulic braking when braking the front wheels Wf, Wf as described above, the kinetic energy of the vehicle body that would be wasted as heat energy during hydraulic braking, can be recovered by the regenerative braking as electric energy, that can be used for charging the battery 1, thus extending the travel range for one charging.

FIG. 3 shows the characteristic of the offset valve 17, in which while the output oil pressure Pm of the master cylinder 9 increases from zero to the offset oil pressure Pmo, the output oil pressure Pv of the offset valve 17 is kept at zero, and when the output oil pressure Pm of the master cylinder 9 further increases, the output oil pressure Pv of the offset valve 17, increases linearly from zero. Therefore, when the brake pedal 8 is depressed, the hydraulic braking force on the rear wheels Wr, Wr that are not connected with the offset valve 17, increases in proportion to the force applied to the brake pedal 8, whereas no hydraulic braking of the front wheels Wf, Wf that are connected with the offset valve 17, is performed until the brake pedal depressing force reaches a predetermined value (i.e., until the output oil pressure Pm of the master cylinder 9 reaches the offset oil pressure Pmo). During this period the regenerative braking force increases with increase in the brake pedal depressing force, and when the output oil pressure Pm of the master cylinder 9 reaches the offset oil pressure Pmo and the regenerative braking force reaches the regeneration limit value $R_0$, the output oil pressure Pv of the offset valve 17 rises, starting the hydraulic braking on the front wheels. The value of offset oil pressure Pmo can be controlled arbitrarily by a command from the brake ECU 7.

The output oil pressure Pm of the master cylinder 9 detected by the hydraulic pressure sensor 19, is inputted into the brake ECU 7, which, while the output oil pressure Pm of the master cylinder 9 increases from zero to the offset oil pressure Pmo, linearly increases the regenerative braking force of the electric motor 1 to the regeneration limit value $R_0$, and after the output oil pressure Pm has exceeded the offset oil pressure Pmo, maintains the regenerative braking force at the regeneration limit value $R_0$.

Figure 4A:
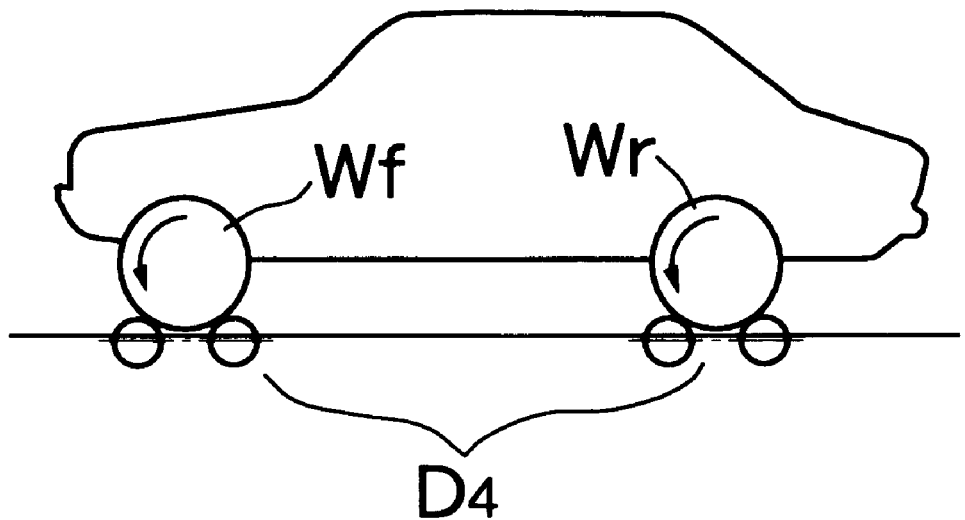
FIGS. 4A and 4B are explanatory diagrams showing the chassis dynamometers.
Figure 4B:
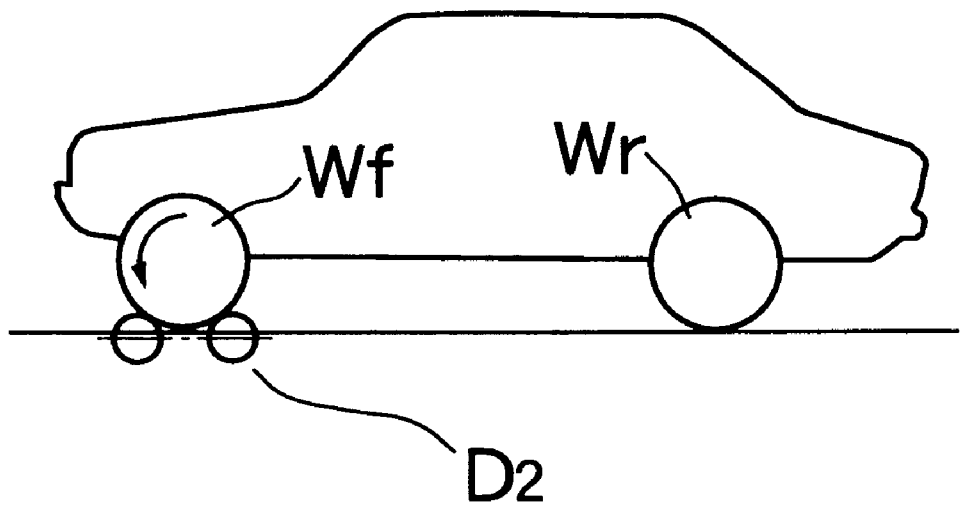

The test for checking whether an electric vehicle produced in a factory, can produce an appropriate regenerative braking force, includes the steps of simulating the actual traveling condition of the vehicle using a chassis dynamometer. There are two types of chassis dynamometer, is a four-axle chassis dynamometer that supports the front wheels Wf, Wf and the rear wheels Wr, Wr with two-axle rollers respectively (see FIG. 4A) and a two-axle chassis dynamometer that supports only the front wheels Wf, Wf, the drive wheels, with two-axle rollers (see FIG. 4B). The four-axle chassis dynamometer $D_4$ is able to measure both the braking force of the front wheels Wf, Wf and the braking force of the rear wheels Wr, Wr but is not widely used because it is expensive. The two-axle chassis dynamometer $D_2$, which is comparatively inexpensive and widely used, can only measure the braking force of the front wheels Wf, Wf. The use of the four-axle chassis dynamometer $D_4$ enables the regenerative braking force test to be performed without causing any problems, by simulating the actual traveling condition of the vehicle. With the two-axle chassis dynamometer $D_2$, however, the regenerative braking force test cannot be carried out accurately. This will be explained below.

The test on the regenerative braking force is performed in a condition in which an external diagnosing device T (see FIG. 1) connected to the chassis dynamometer is connected to the brake ECU 7, by simulating the actual traveling conditions with the electric vehicle mounted on the chassis dynamometer, and by depressing the brake pedal 8 by the driver.

When the driver depresses the brake pedal 8, the total braking force of the front wheels Wf, Wf and rear wheels Wr, Wr in the case of the four-axle chassis dynamometer $D_4$ or the braking force of only the front wheels Wf, Wf in the case of the two-axle chassis dynamometer $D_2$, is detected by the chassis dynamometer $D_4$ or $D_2$ and outputted to the diagnosing device T. The diagnosing device T compares the regenerative braking force calculated from the braking force detected by the chassis dynamometer $D_4$ or $D_2$, with the regenerative braking force output from the brake ECU 7 to determine if normal braking is performed.

When the four-axle chassis dynamometer $D_4$ is used, the above judgment can be made without any additional correction. In more concrete terms, if the braking system works normally, when the total braking force of the front wheels Wf, Wf and rear wheels Wr, Wr is, for example, $F_1'$ in FIG. 7, the regenerative braking force of the front wheels Wf, Wf must be $A_1'B_1'$, the hydraulic braking force of the front wheels Wf, Wf must be zero, and the hydraulic braking force of the rear wheels Wr, Wr must be $B_1'C_1'$. Hence, the regenerative braking force of the front wheels Wf, Wf (for example, $A_1'B_1'$) is calculated from the total braking force (for instance, $F_1'$) on the basis of the braking force distribution ratio previously stored in the brake ECU 7. If an error between this calculated regenerative braking force and a command value of the regenerative braking force output from the brake ECU 7, is smaller than a predetermined value, it is determined that a normal braking force is produced.

When the two-axle chassis dynamometer $D_2$ is used, only the braking force of the front wheels Wf, Wf is considered while the braking force of the rear wheels Wr, Wr is not considered. Hence, in order to make the braking force detected by the two-axle chassis dynamometer $D_2$ equal to the braking force detected by the four-axle chassis dynamometer $D_4$, a greater brake pedal depressing force is necessary. For example, in FIG. 7, when the output oil pressure Pm of the master cylinder 9 is $A_1'$, the total braking force of the front wheels Wf, Wf and rear wheels Wr, Wr is $F_1'$. To produce $F_1'$ with only the braking force of the front wheels Wf, Wf detected by the two-axle chassis dynamometer $D_2$, the brake pedal depressing force must be increased to $A_1$. The brake ECU 7 incorrectly determines that the total braking force of the front wheels Wf, Wf and rear wheels Wr, Wr is $F_1$ corresponding to the brake pedal depressing force $A_1$, and calculates the regenerative braking force corresponding to the braking force $F_1$ and obtains $A_1B_1$. At this time the command value of the regenerative braking force output from the brake ECU 7 is $A_1B_1$ that corresponds to the output oil pressure $A_1$ of the master cylinder 9, so that the regenerative braking force $A_1'B_1'$ calculated from the output of the two-axle chassis dynamometer $D_2$ does not agree with the command value $A_1B_1$ of the regenerative braking force output from the brake ECU 7, rendering a correct judgment impossible.

This invention is intended to perform a test on the regenerative braking force by using an inexpensive two-axle chassis dynamometer $D_2$, and for this purpose, the brake ECU 7 changes the braking force test mode.

Now, the operation of the preferred embodiment will be described referring to the flow chart.

The flow chart of FIG. 5 shows the overall processing flow of the regenerative braking force test using the two-axle chassis dynamometer $D_2$. If at Step S1 it is determined that the regenerative braking force test using the two-axle chassis dynamometer $D_2$ is to be performed, the procedure moves to Step S2 where a command from the diagnosing device T changes the mode of the brake ECU 7 to the regenerative braking force test mode, and at Step S3 an alarm lamp is turned on to indicate that the mode has changed from the normal mode to the test mode.

When it is necessary, in the subsequent Step S4, to change the braking force distribution ratio for the regenerative braking force test because of a change of a tire or brake pad of the electric vehicle, the diagnosing device T at Step S5 modifies the braking force distribution ratio for the test stored in the brake ECU 7. Then, at Step S6 the regenerative braking force test of the front wheels Wf, Wf is performed. After the regenerative braking force test is finished at Step S7, the diagnosing device T changes the mode of the brake ECU 7 from the test mode back to the normal mode at Step S8, turning off the alarm lamp at Step S9 and shifting to the normal mode control at Step S10.

Figure 6:
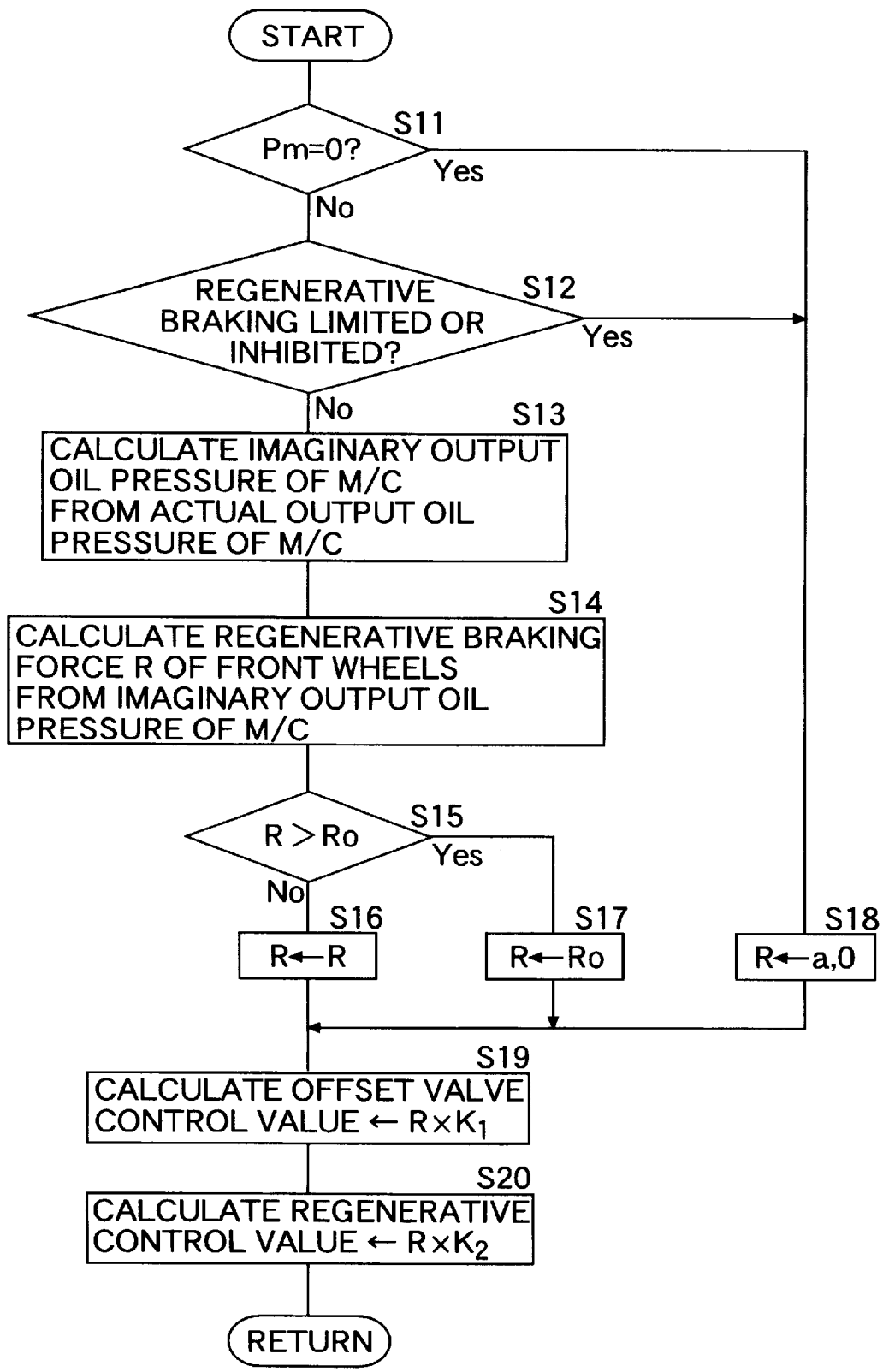
FIG. 6 is a flow chart showing the procedure of calculating the braking force distribution ratio for the regenerative braking force test.

FIG. 6 is another flow chart showing processing performed by the brake ECU 7 when conducting a regenerative braking force test. When at Step S11 the output oil pressure Pm of the master cylinder 9 is zero because the brake pedal 8 is not depressed, or when, even if the brake pedal 8 is depressed at Step S11, the regenerative braking is limited or inhibited at Step S12, the regenerative braking force R is set at a value a smaller than the normal value, $R_0$, or at zero.

The condition for limiting the regenerative braking of an actually traveling electric vehicle is when the ABS system is operating or has failed, for example. The condition for inhibiting the regenerative braking is when the vehicle speed is very slow, when the ignition voltage is below a minimum voltage, or when the brake system has failed, for example. During the test using the two-axle chassis dynamometer $D_2$, however, the rear wheels Wr, Wr are at rest and consequently determined to be locked, so that the ABS system operates. This causes the regenerative braking force R to be limited to a value a at all times in Step S18, rendering the regenerative braking force test impossible. Hence, during the test using the two-axle chassis dynamometer $D_2$, the condition that "the ABS system is operating or failed" is removed from the conditions for limiting the regenerative braking in Step S12. This prevents the regenerative braking force R from being limited at Step S18, allowing the braking force test to be performed without any problem.

When at Step S11 the output oil pressure Pm of the master cylinder 9 is not zero and at Step S12 the regenerative braking is not limited nor inhibited, the corrected regenerative braking force R (hereinafter referred to as an imaginary regenerative force R) is calculated in Steps S13 to S17. This calculation process will be described by referring to FIGS. 7 and 8. First, at Step S13 an imaginary output oil pressure $A_1'$, $A_2'$ that corresponds to the actual output oil pressure Pm of the master cylinder 9 detected by the hydraulic pressure sensor 19 (i.e., actual output oil pressure $A_1$, $A_2$ in FIGS. 7 and 8) is calculated. In other words, when the actual output oil pressure of the master cylinder 9 is $A_1$ or $A_2$, the total braking force of the front wheels Wf, Wf and rear wheels Wr, Wr is theoretically $F_1$ or $F_2$. Because the braking force detected by the two-axle chassis dynamometer $D_2$ is $F_1'$ or $F_2'$ which is the braking force of the front wheels Wf, Wf, an imaginary output oil pressure $A_1'$, $A_2'$ is calculated when assuming that the braking force $F_1'$, $F_2'$ is the total braking force of the front wheels Wf, Wf and rear wheels Wr, Wr.

At the next Step S14, the regenerative braking force of the front wheels Wf, Wf ($A_1'B_1'$ or $A_2'B_2'$) is calculated from the total braking force $F_1'$, $F_2'$ of the front wheels Wf, Wf and rear wheels Wr, Wr corresponding to the imaginary output oil pressure $A_1'$, $A_2'$, based on the braking force distribution ratio. At this time, the calculated regenerative braking force $A_1'B_1'$ or $A_2'B_2'$ is compared with the regeneration limit value $R_0$ in Step S15. If, as shown in the first pattern of FIG. 7, the regenerative braking force $A_1'B_1'$ is equal to or lower than the regeneration limit value $R_0$, the regenerative braking force $A_1'B_1'$ is taken to be the final imaginary regenerative braking force R in Step S16. On the other hand, if, as shown in the second pattern of FIG. 8, the regenerative braking force $A_2'B_2'$ exceeds the regeneration limit value $R_0$ ($A_2'D_2'$), the regeneration limit value $R_0$ at Step S14 is taken to be the final imaginary regenerative braking force R.

Then the brake ECU 7 calculates at Step S19 the control value from $R \times K_1$ (where $K_1$ is a proportional constant) to eliminate the hydraulic braking force corresponding to the imaginary regenerative braking force R from the hydraulic braking force of the front wheels Wf, Wf, and sends the calculated control value to the offset valve 17. At Step S20, the brake ECU 7 calculates the control value based on $R \times K_2$ (where $K_2$ is a proportional constant) to cause the electric motor 2 to generate a regenerative braking force equal to the imaginary regenerative braking force R and then outputs the control value to the electric motor 2.

Figure 7:
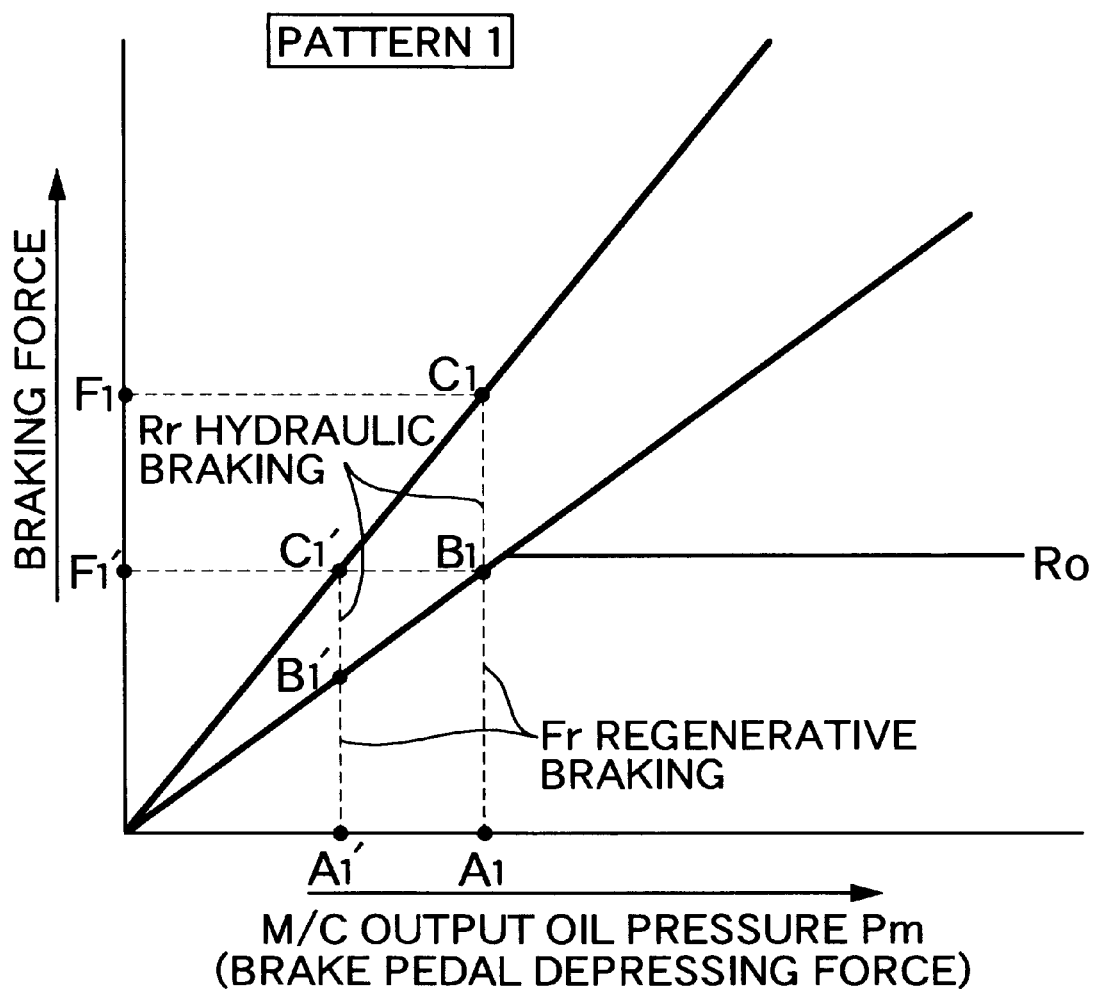
FIG. 7 is a graph showing the first pattern of the braking force distribution ratio.
Figure 8:
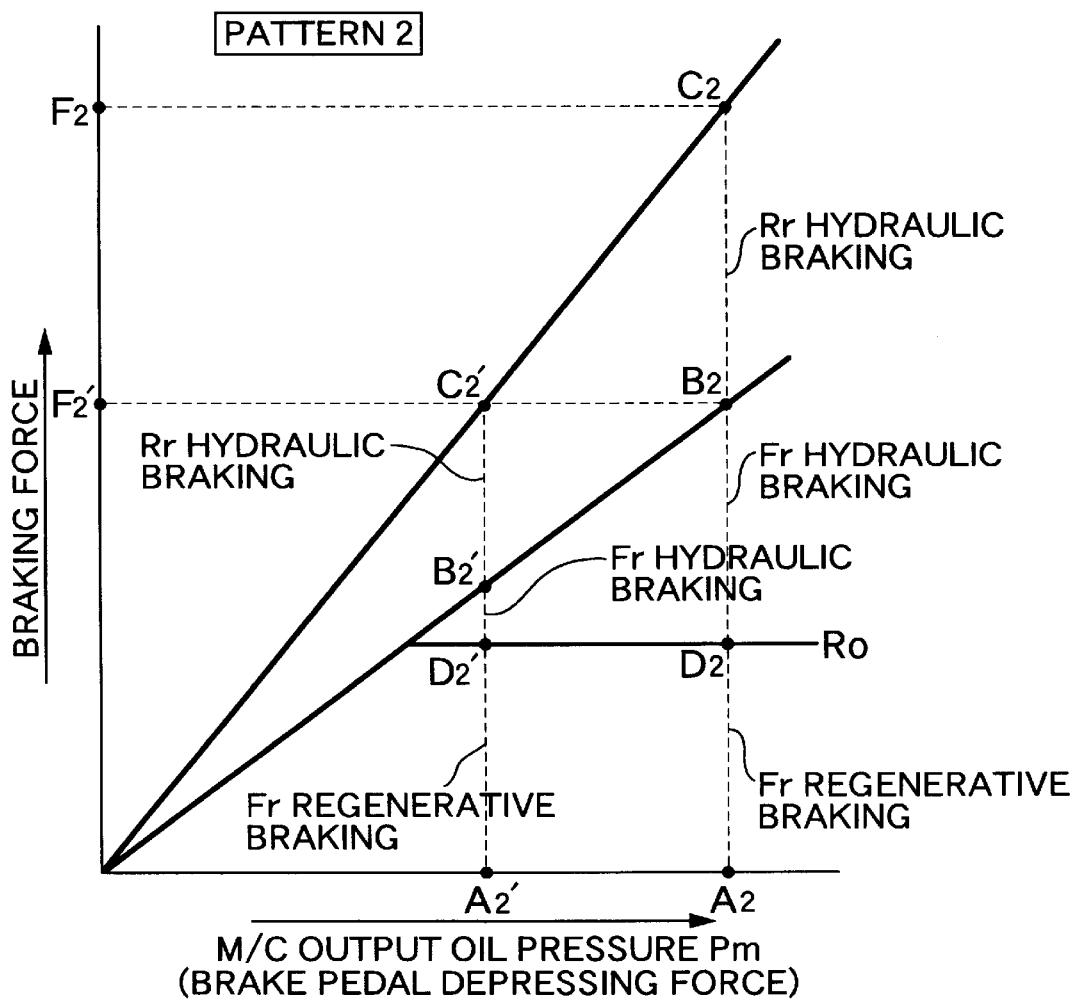
FIG. 8 is a graph showing the second pattern of the braking force distribution ratio.

The diagnosing device T assumes that the braking force of the front wheels Wf, Wf detected by the two-axle chassis dynamometer $D_2$ is the total braking force $F_1'$, $F_2'$ of the front wheels Wf, Wf and rear wheels Wr, Wr of FIGS. 7 and 8, and calculates the regenerative braking force $A_1'B_1'$, $A_2'D_2'$ of the front wheels Wf, Wf (hereinafter referred to as a reference regenerative braking force) on the basis of the braking force distribution ratio data.

Then, the diagnosing device T compares the reference regenerative braking force with the imaginary regenerative braking force calculated at the Steps S16, S17 and S18 shown in the flow chart of FIG. 6. If the difference between reference and the imaginary regenerative braking forces is smaller than a predetermined value, the diagnosing device T determines that the electric motor 2 is producing a normal regenerative braking force and, if the difference exceeds the predetermined value, it determines that there is something abnormal. Thus, the regenerative braking force test can be performed easily and precisely by using the two-axle chassis dynamometer $D_2$ in the same way as when the four-axles chassis dynamometer $D_4$ is used.

Although the above embodiment concerns an electric vehicle that has the front wheels Wf, Wf as driven wheels and the rear wheels Wr, Wr as follower wheels, this invention is also applicable to an electric vehicle with the front wheels Wf, Wf being follower wheels and the rear wheels Wr, Wr being driven wheels. Further, while this embodiment detects the force applied to the brake pedal 8 indirectly as the output oil pressure Pm of the master cylinder 9, the force may be directly detected by a pedal depressing force sensor.

According to the present invention, when the regenerative braking force test on the driven wheels is performed by using a two-axle chassis dynamometer, the imaginary pedal depressing force to produce the total braking force is calculated, assuming the detected braking force of the driven wheels is a total braking force of the driven wheels and follower wheels. Based on this imaginary pedal depressing force, a determination is made of whether the regenerative braking force of the driven wheels is appropriate or not. This method allows the regenerative braking force test using the two-axle chassis dynamometer, to be conducted in the same way as when the four-axle chassis dynamometer is used.

Further, according to the present invention, even when a vehicle to be subjected to the regenerative braking force test using the two-axle chassis dynamometer incorporates an ABS system, the test can be performed without any trouble.

One embodiment of this invention has been described. It should be noted that various design modifications may be made without departing from the spirit of this invention.

We claim:

1. In an electric vehicle in which the braking force to driven wheels is regenerative braking and hydraulic braking and to follower wheels is hydraulic braking, wherein the braking force distribution to the driven and follower wheels is predetermined as a function of the force of depressing a braking pedal and, braking is performed based on distribution data; a method of testing the regenerative braking force produced by the driven wheels based on the depressing force of the brake pedal and the braking force of the driven wheels detected by a two-axle chassis dynamometer, comprising the steps of:

detecting the braking force of the driven wheels using the two-axle chassis dynamometer;

calculating a reference regenerative braking force produced by the driven wheels according to the distribution data, assuming that the detected braking force is a total braking force of the driven wheels and the follower wheels;

detecting an actual depressing force applied to the brake pedal;

calculating, on the basis of the actually detected pedal depressing force and the distribution data, an imaginary pedal depressing force required to produce a total braking force of the driven wheels and follower wheels equal to the braking force produced by the driven wheels in the actually detected pedal depressing force;

calculating, on the basis of the imaginary pedal depressing force and the distribution data, an imaginary regenerative braking force produced by the driven wheels; and comparing the reference regenerative braking force and the imaginary regenerative braking force.

2. A regenerative braking force test method in an electric vehicle according to claim 1, wherein the electric vehicle includes an ABS system, for inhibiting the regenerative braking of the driven wheels when the follower wheels are locked, and allowing the regenerative braking of the driven wheels even when the follower wheels are locked, during the test using the two-axle chassis dynamometer.

* * * * *